(12) United States Patent
Dickinson (10) Patent No.: US 12,270,681 B2
(45) Date of Patent: Apr. 8, 2025

(54) HUBODOMETER WITH ORBITING DETECTION AND CANCELATION

(71) Applicant: Dynapar Corporation, Elizabethtown, NC (US)

(72) Inventor: Kenneth L. Dickinson, Columbus, OH (US)

(73) Assignee: DYNAPAR CORPORATION, Elizabethtown, NC (US)

( * ) Notice: Subject to any disclaimer, the term of this patent is extended or adjusted under 35 U.S.C. 154(b) by 185 days.

(21) Appl. No.: 18/149,861

(22) Filed: Jan. 4, 2023

(65) Prior Publication Data

US 2023/0213355 A1 Jul. 6, 2023

Related U.S. Application Data

(60) Provisional application No. 63/296,791, filed on Jan. 5, 2022.

(51) Int. Cl.
*G01C 22/00* (2006.01)
*G01D 3/036* (2006.01)
*G01P 15/08* (2006.01)

(52) U.S. Cl.
CPC .......... *G01C 22/00* (2013.01); *G01D 3/0365* (2013.01); *G01P 15/0888* (2013.01)

(58) Field of Classification Search
CPC .... G01C 22/00; G01D 3/0365; G01P 15/0888
USPC ................................. 235/95 B, 95 C, 95 R
See application file for complete search history.

(56) References Cited

U.S. PATENT DOCUMENTS

| | | | |
|---|---|---|---|
| 3,356,298 A | 12/1967 | Crilly | |
| 4,156,131 A | 5/1979 | Haynes et al. | |
| 5,524,034 A | 6/1996 | Srygley et al. | |
| 2008/0101053 A1* | 5/2008 | Hoffman | G09F 21/045 345/82 |
| 2015/0087455 A1* | 3/2015 | Oh | F16H 55/36 474/166 |
| 2018/0058881 A1 | 3/2018 | Stewart, Jr. et al. | |
| 2019/0381998 A1* | 12/2019 | Anderson | B60W 30/02 |
| 2021/0061028 A1 | 3/2021 | Da Deppo et al. | |

(Continued)

OTHER PUBLICATIONS

International Search Report for International Application No. PCT/US2023/060096 dated Apr. 20, 2023, 3 pages.

(Continued)

*Primary Examiner* — Edwyn Labaze
(74) *Attorney, Agent, or Firm* — Jordan IP Law LLC (57) ABSTRACT

Operation of a hubodometer includes orbiting detection and cancelation. In particular, in a hubodometer having a housing that rotates relative to a pendulous assembly, such operation includes detecting, by at least one orbiting sensor operatively connected to the pendulous assembly, an orbiting condition of the pendulous assembly, the orbiting condition being at least partly defined by an orbiting direction. Thereafter, and responsive to the detection of the orbiting condition, operation of the hubodometer further comprises applying, by an electric actuator operatively connected to the pendulous assembly, a countervailing force to the pendulous assembly in a direction opposite the orbiting direction. Through application of the countervailing force, the orbiting condition may be canceled.

12 Claims, 5 Drawing Sheets

(56) References Cited

U.S. PATENT DOCUMENTS

2021/0324837 A1* 10/2021 Abers .................... F03G 7/125

OTHER PUBLICATIONS

Written Opinion of the International Search Authority for International Application No. PCT/US2023/060096 dated Apr. 20, 2023, 6 pages.

* cited by examiner

HUBODOMETER WITH ORBITING DETECTION AND CANCELATION

FIELD

The present disclosure generally concerns hubodometers and, in particular, the detection and cancelation of orbiting in such hubodometers.

BACKGROUND

Figure 1:
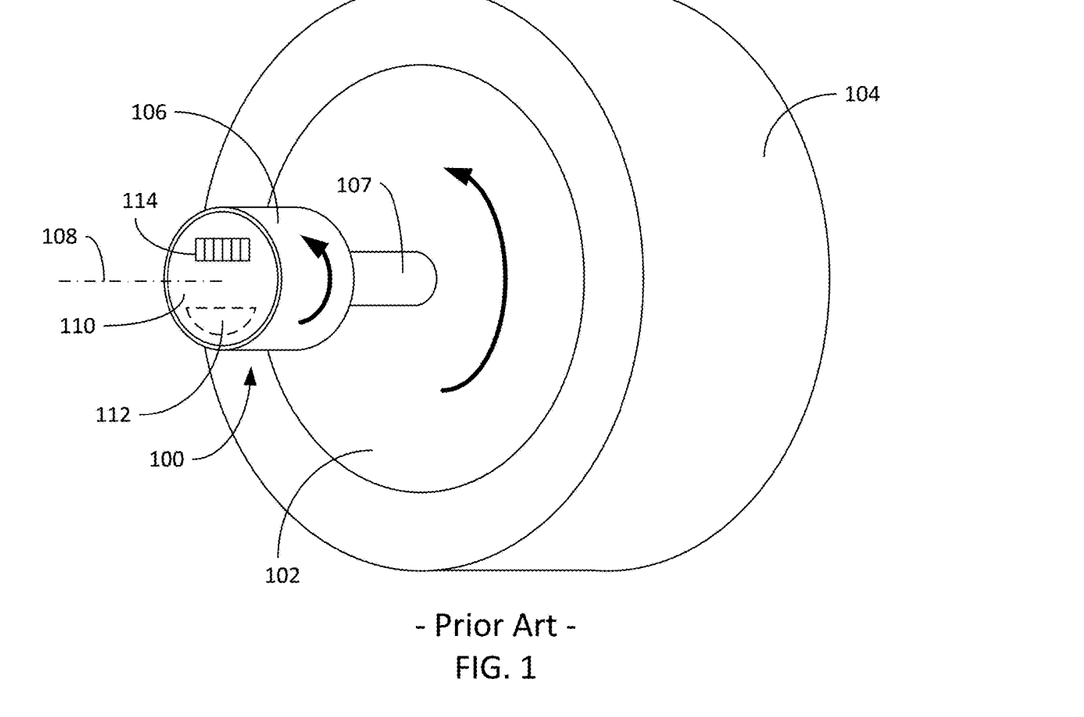
FIG. 1 illustrates a hubodometer and a deployment thereof in accordance with prior art techniques.

Hubodometers (also sometimes referred to as hub odometers or hubodometers), are well-known in the art. An example of a typical hubodometer 100 is illustrated in FIG. 1 where the hubodometer 100 is attached to a rim 102 of a tire 104. Generally, the hubodometer 100 comprises a housing 106 that may be rigidly attached to the "hub" of the rim 102 (via a suitable mounting member 107) such that a rotational axis 108 of the housing 106 is aligned with a rotational axis of the rim 102 and tire 104. Thus, rotation of the rim 102 induces identical rotation of the housing 106, as shown by the heavy arrows illustrating (in this case) counterclockwise rotation.

The hubodometer 100 further comprises a pendulous assembly 110 having its central point also aligned with the axis of rotation 108 of the housing 106. The pendulous assembly 110 is mounted, at its central point, on an internal housing axle (not shown) centered on the rotational axis 108 and that rotates along with the housing 106. However, the pendulous assembly 110 is mounted on the internal housing axle such that rotation of pendulous assembly 110 is largely prevented, e.g., via a roller bearing or the like between the internal housing axle the pendulous assembly 110. Rotation of the pendulous assembly 110 is further prevented through the provision of an off-center weight 112 mounted on the pendulous assembly 110. The weight 112 is of sufficient mass relative to all other components supported by the pendulous assembly 110 such that a center of gravity of the pendulous assembly 110 is below, and preferably well below, the rotational axis 108 and center point of the pendulous assembly 110. Constructed in this manner, the pendulous assembly 110 has a comparatively high moment of inertia such that, under nominal conditions, rotation of the housing 106 is unlikely to induce rotation of the pendulous assembly 110.

A counter mechanism 114 mounted on the pendulous assembly 110 is configured to interact with the housing 106 such that each rotation of the housing 106 causes the counter mechanism 114 to increment. For example, in earlier designs of hubodometers, the counter mechanism 114 has an arm that contacts a cam mounted on the housing 106 such that each rotation of the housing 106 induces cyclic movement of the arm, thus incrementing the counter mechanism 114. In newer hubodometers, rotational counting is achieved through the use of one or more magnetic sensors mounted on the pendulous assembly 110 that detect one or more magnets mounted on the interior of the housing 106 that rotate past, but in proximity to (without contacting), the magnetic sensors. Regardless of how such counting is performed, accurate rotational counts (and, thus, accurate mileage determinations for the vehicle to which the rim 102/wheel 104 are attached) are achieved so long as the pendulous assembly 110 maintains its substantially vertical alignment (as shown in FIG. 1) relative to the rotations of the housing 106.

Figure 2:
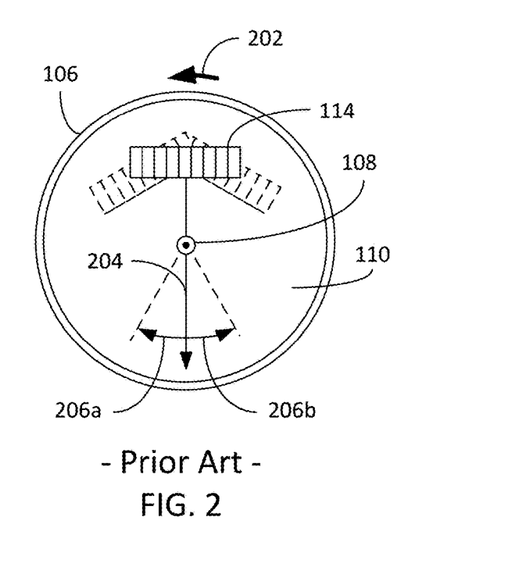
FIGS. 2 and 3 illustrate oscillating and orbiting states that often occur in hubodometers in accordance with prior art techniques.
Figure 3:
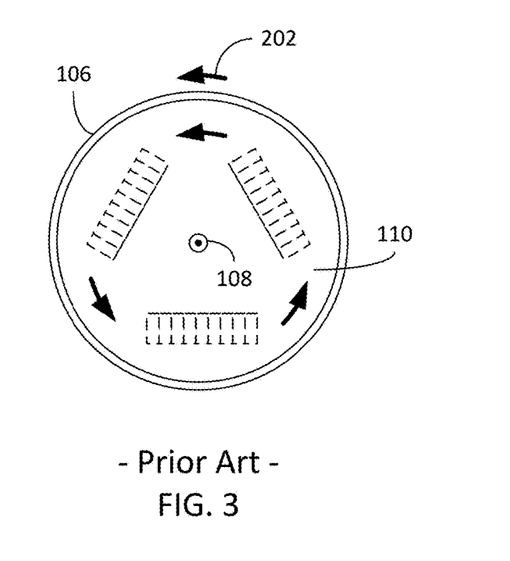

Despite the inertia of the pendulous assembly 110, the widely varying conditions that hubodometers are exposed to (e.g., substantial vibrations, temperature and moisture extremes, etc.) often lead to oscillations of the pendulous assembly 110, an example of which is illustrated in FIG. 2. In particular, FIG. 2 illustrates clockwise and counterclockwise rotational oscillations 206a, 206b (illustrated with dashed lines) of the pendulous assembly 110 relative to gravitational normal direction 204. Provided that such oscillations stay below a certain threshold (e.g., 30 degrees relative to the gravitational normal direction 204), the counting mechanism 114 should still be able to operate correctly. However, in some conditions, the oscillatory motion thus produced coupled with the rotation 202 of the housing 106 can cause the pendulous assembly 110 to make complete rotations about the rotational axis 108, eventually turning in synchrony with the housing 106, as shown in FIG. 3. This condition, often referred to as "orbiting," once started, is likely to continue for as long as the housing 106 continues to rotate. More importantly, such orbiting effectively prevents any accurate counting by the counting mechanism, thus leading to unreliable results. Worse still, even when rotation of the housing 106 is discontinued, the rotational inertia of the pendulous assembly 110 will sometimes cause the pendulous assembly 110 to continue to orbit relative to the housing 106, thereby further exacerbating counter inaccuracy.

Existing solutions for the problem of orbiting in hubodometers are generally focused on prevention of orbiting. For example, U.S. Pat. No. 3,356,298 describes a dual pendulum structure in which a first pendulum of the pendulous assembly effectively swings within and contacts a second pendulum having an inertia that is generally larger than an inertia of the first pendulum. The interactions of the two pendulums thus has an even greater tendency to dampen any oscillations that may occur in the pendulous assembly, thereby providing increased resistance to orbiting conditions. Nevertheless, despite this solution, orbiting conditions still have a tendency to occur with unacceptable frequency.

Thus, techniques that provide better performance in resisting, or even counteracting, such orbiting conditions would represent a welcome advancement of the art.

SUMMARY

Techniques for overcoming the above-noted challenges include one or more methods for operating a hubodometer that include orbiting detection and cancelation. In particular, in a hubodometer having a housing that rotates relative to a pendulous assembly, the method includes detecting, by at least one orbiting sensor operatively connected to the pendulous assembly, an orbiting condition of the pendulous assembly, the orbiting condition being at least partly defined by an orbiting direction. Responsive to detecting the orbiting condition, the method further comprises applying, by an electric actuator operatively connected to the pendulous assembly, a countervailing force to the pendulous assembly in a direction opposite the orbiting direction.

In an embodiment, the at least one orbiting sensor operates to determine an angle of the pendulous assembly relative to a gravitational normal direction, in which case the step of detecting the orbiting condition further comprises detecting that the angle of the pendulous assembly exceeds an angular threshold. According to one implementation, such an orbiting sensor comprises a pendulum and at least one switch positioned according to the angular threshold. In this case, the step of detecting that the angle of the pendulous assembly exceeds the angular threshold further comprises sensing actuation of the at least one switch by the pendulum.

In another embodiment, the at least one orbiting sensor comprises at least one accelerometer, in which case the step of detecting the orbiting condition further comprises determining that an output value of the accelerometer exceeds an acceleration threshold.

In another embodiment, the electric actuator is a generator-motor component operatively connected to the pendulous assembly and magnetically coupled to the housing. In this case, the step of applying the countervailing force further comprises generating a magnetic field by the generator-motor component, which magnetic field induces the countervailing force relative to at least one magnet attached to the housing. In an alternative embodiment, the electric actuator is a generator-motor component operatively connected to the pendulous assembly and mechanically coupled to the housing. In this case, the step of applying the countervailing force further comprises reversing operation of the generator-motor component.

A corresponding hubodometer is also disclosed.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, phrases substantially similar to "at least one of A, B or C" are intended to be interpreted in the disjunctive, i.e., to require A or B or C or any combination thereof unless stated or implied by context otherwise. Further, phrases substantially similar to "at least one of A, B and C" are intended to be interpreted in the conjunctive, i.e., to require at least one of A, at least one of B and at least one of C unless stated or implied by context otherwise. Further still, the term "substantially" or similar words requiring subjective comparison are intended to mean "within manufacturing tolerances" unless stated or implied by context otherwise.

As used herein, the phrase "operatively connected" refers to at least a functional relationship between two elements and may encompass configurations in which the two elements are directed connected to each other, i.e., without any intervening elements, or indirectly connected to each other, i.e., with intervening elements.

Figure 4:
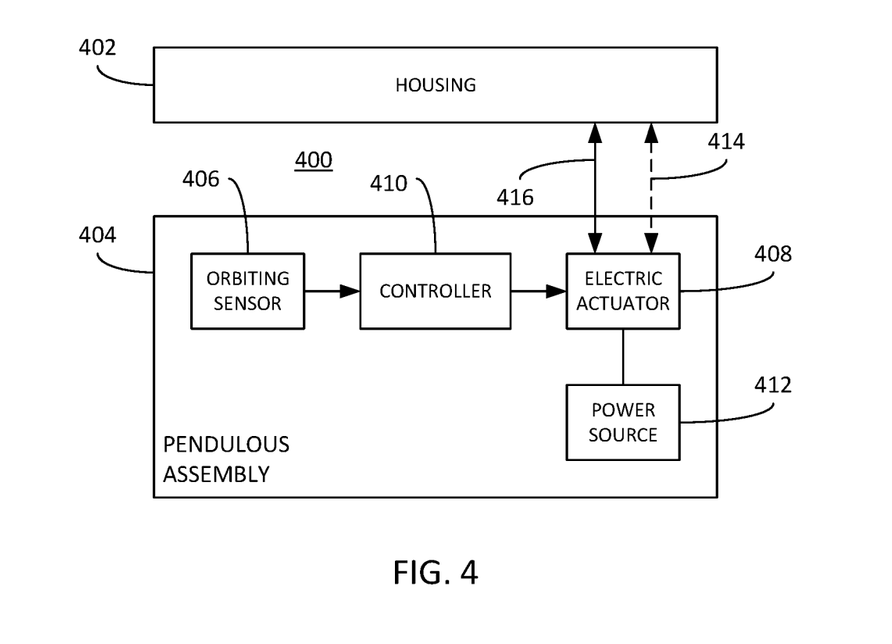
FIG. 4 is a block diagram very schematically illustrating a hubodometer in accordance with the instant disclosure.

Referring now to FIG. 4, a block diagram is shown very schematically illustrating a hubodometer 400 in accordance with the instant disclosure. The hubodometer 400 comprises a rotatable housing 402 and a pendulous assembly 404 that, in implementation, is disposed within the housing 402 with a side thereof (i.e., an outward-facing side) exposed. As described above, the pendulous assembly 404 is free to rotate relative to the housing 402 and is constructed to have a moment of inertia (via an off-center weight or the like, not shown) that resists rotation of the pendulous assembly 404. The pendulous assembly 404 has one or more orbiting sensors 406 operatively connected to, preferably fixedly mounted on, the pendulous assembly 404, as well as one or more electric actuators 408 also operatively connected to, preferably fixedly mounted on, the pendulous assembly 404. In turn, both the orbiting sensor(s) 406 and electric actuator(s) 408 are operatively connected to a controller 410 that provides control logic for the electric actuator(s) 408 based on input provided by the orbiting sensor(s) 406. The electric actuator(s) 408 are also in electrical communication with a power source 412 (e.g., a rechargeable battery or capacitor) such that the controller 410 can selectively activate/deactivate the electric actuator(s) 408. Examples of implementations of the orbiting sensor(s) 406 and electric actuator(s) 408 are described in further detail below.

The controller 410, which may comprise a suitably configured microprocessor or the like, operates to determine when an orbiting condition has been indicated by the orbiting sensor(s) 406. As used herein, an orbiting condition refers to data indicating an orbiting state of the pendulous assembly 404 or a precursor state known to precede such orbiting. Thus, for example, where oscillations of the pendulous assembly 404 cause an angle of the pendulous assembly 404 (relative to a gravitational normal direction) to exceed a threshold, the orbiting sensor(s) 406 may operate to provide such data to the controller 410 that, in turn, interprets the excessive oscillations as an orbiting condition that is a precursor to full-rotation orbiting. In another example, the orbiting sensor(s) 406 may comprise accelerometers deployed to detect acceleration data in either rotational direction of the pendulous assembly 404. When such acceleration data, provided to the controller 410, exceeds a threshold, the controller 410 may once again interpret such acceleration data as a precursor to orbiting. In practice, in addition to providing data that allows the controller 410 to determine the existence of an orbiting condition, the data provided by the orbiting sensor(s) 406 preferably also facilitates a determination of an orbiting direction, e.g., clockwise or counterclockwise rotation within a plane of the pendulous assembly 404. For example, in the case accelerometers as described above, having the accelerometers oriented opposite each other can be used detect accelerations in opposite directions, thereby allowing for an inference of an orbiting direction.

Figure 5:
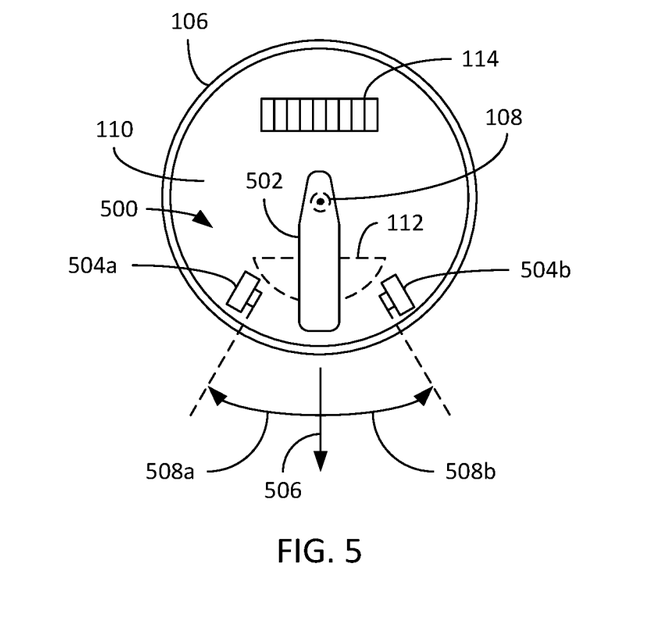
FIG. 5 is diagram schematically illustrating an embodiment of an orbiting sensor in accordance with the instant disclosure.

FIG. 5 schematically illustrates an example of an orbiting sensor 500 configured to not only detect occurrences of orbiting conditions, but also orbiting directions. As shown the orbiting detector 500 comprises a pendulum 502 arranged to freely swing about the rotational axis 108 of the hubodometer. For example, the pendulum 502 may be coupled to housing's axis via a suitable roller bearing or the like. The pendulum 502 is fabricated to have a relatively high moment of inertia so as to generally align with a gravitational normal direction 506. A pair of contact switches 504a, 504b are positioned, relative to the gravitational normal direction 506, according to any desired angular threshold 508a, 508b to be used in determining the occurrence of an orbiting condition. As shown, the switches 504a, 504b are positioned on opposite sides of the pendulum 502 and at radial distances from the rotational axis 108 such that rotation of the pendulous assembly 110 may cause either or both of the switches 504a, 504b to come into contact with the pendulum 502. Though not shown in FIG. 5, each of the switches 504a, 504b is electrically coupled to, and thereby providing control inputs to, the controller 410. Assuming the angular thresholds 508a, 508b are chosen to be sufficiently large, relatively small rotations or oscillations of the pendulous assembly 110 will prevent any contact between the pendulum 502 and either of the switches 504a, 504b. However, relatively larger rotations/oscillations of the pendulous assembly 110 will cause the pendulum 502 to come into contact with either or both of the switches 504a, 504b, thereby actuating those switches and providing one or more electrical signals to the controller 410, which signals may be interpreted by the controller 410 as indicative of an occurrence of an orbiting condition. Further, the orbiting direction associated with the orbiting condition may be inferred based on which switch 504a, 504b is actuated. For example, as depicted in FIG. 5, if switch 504a is actuated, this may serve as an indication that a counterclockwise orbiting direction has been encountered, whereas, if switch 504b is actuated, this may serve as an indication that a clockwise orbiting direction has been encountered Referring once again to FIG. 4, the electrical actuator 408 is provided to effectuate active correction to, or even cancelation of, a detected orbiting condition. As used herein, the term "active" refers to undertaking an action using the electric actuator 408, in response to detecting an orbiting condition, to affirmatively counter such orbiting condition. This is in opposition to prior art techniques in which mechanical means attempt to passively counteract an orbiting condition (i.e., without prior detection of an occurrence of the orbiting condition). Various examples of implementations in which electric actuators are provided to actively counteract orbiting conditions are illustrated in FIGS. 6 and 7, as described below.

The application of a countervailing force to opposing orbiting conditions is schematically illustrated in FIG. 4 by arrows 414, 416. In accordance with the implementations of FIGS. 6 and 7 described below, the electric actuator 408 may be magnetically coupled 414 to the housing 402 or mechanically coupled 416. In the case of magnetic coupling 414, activation of the electric actuator 408 results in the magnetic coupling 414 between the electric actuator 408 and the housing 402 being employed to apply a countervailing force to the pendulous assembly 404, thereby avoiding or obviating an orbiting condition. On the other hand, in the case of mechanical coupling 414, activation of the electric actuator 408 results in the mechanical coupling 414 between the electric actuator 408 and the housing 402 being employed to apply a countervailing force to the pendulous assembly 404, thereby avoiding or obviating an orbiting condition.

Figure 6:
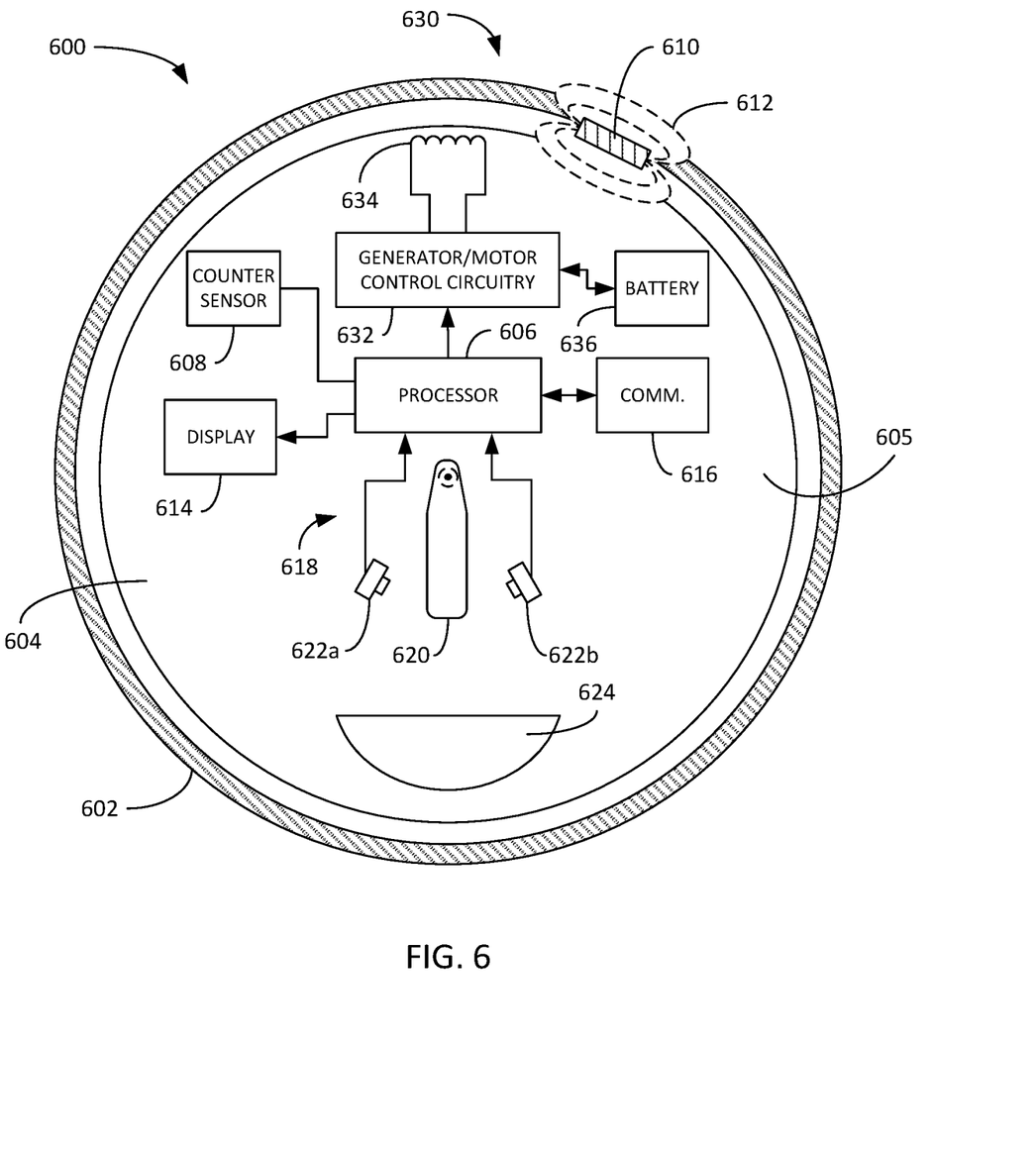
FIG. 6 is a partial cross-sectional and elevational view illustrating an embodiment of a hubodometer in accordance with the instant disclosure.
Figure 7:
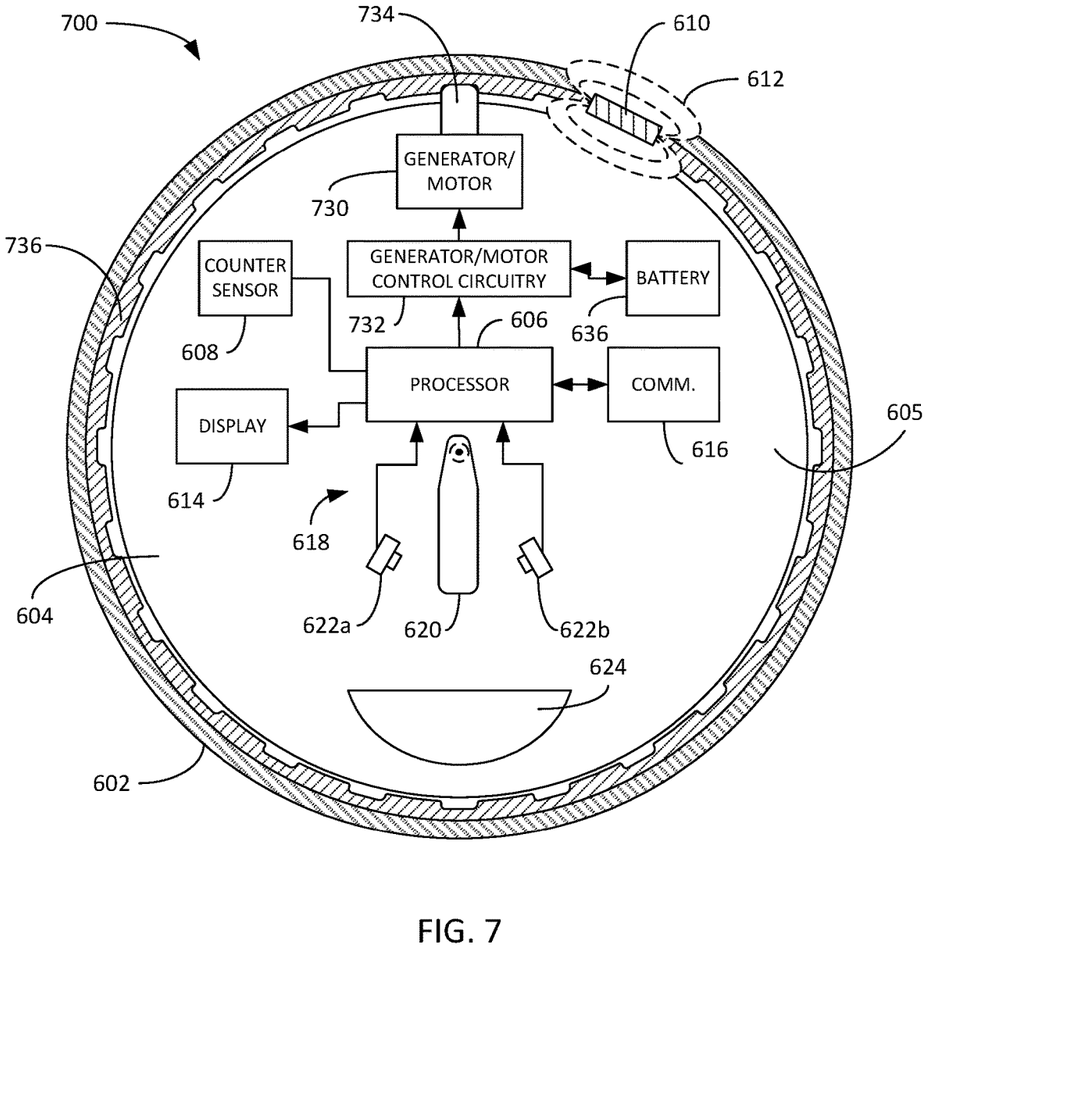
FIG. 7 is a partial cross-sectional and elevational view illustrating another embodiment of a hubodometer in accordance with the instant disclosure.

FIGS. 6 and 7 illustrate examples of hubodometers 600, 700 from the point of view of a rear surface 605 of a pendulous assembly 604, i.e., from within the housing 602, shown in cross-section. Starting with the implementation shown in FIGS. 6 and 7, the hubodometer 600 comprises an off-center weight 624 establishing passive inertia of the pendulous assembly 604. A processor 606 is mounted on the pendulous assembly 604. In an embodiment, the processor 606 may include one or more devices such as microprocessors, microcontrollers, digital signal processors, or combinations thereof, capable of executing stored instructions and operating upon stored data that is stored in, for example, memory (not shown for ease of illustration). Such memory may include one or more devices such as volatile or non-volatile memory including, but not limited to, random access memory (RAM) or read only memory (ROM). Processor and memory arrangements of the types illustrated in FIG. 6 (and FIG. 7) are well known to those having skill in the art. In one embodiment, the processing techniques described herein are implemented as a combination of executable instructions and data within such memory used to control operation of, and operated upon by, the processor 606.

The pendulous assembly 604 further comprises one or more counter sensors 608 fixedly mounted thereon, which sensors 608 cooperate, in this implementation, with one or more magnets 610 fixedly mounted on the housing 602, for example, on an interior, circumferential surface of the housing 602. In this manner, the magnet(s) 610 revolve about the pendulous assembly 604 along with the housing 602 such that, for each rotation of the housing 602, the magnet(s) 610 are brought into proximity to, without touching, the sensor(s) 608. In this case, the sensor(s) 608 comprise magnetically sensitive devices, such as reed switches or Hall effect sensors, that operate to detect a magnetic field 612 presented by the rotating magnet(s) 610. Thus, each time a magnet 610 rotates past a counter sensor 608, a signal is provided by the counter sensor 608 to the processor 606, which implements a rotation count based on such signals in accordance with known techniques.

Other conventional components mounted on the pendulous assembly 604 and in communication with the processor 606 include, for example, a display 614 and communication circuitry 616. For example, the display may comprise a liquid crystal display (LCD) configured to visually display odometer readings based on the rotational count maintained by the processor 606. Similarly, the communication circuitry 616 may comprise, for example, wireless near-field communication (NFC) circuitry that allows the processor 606 to communicate data with an external device, such as a mobile computer, etc.

The illustrated hubodometer 600 also comprises an orbiting sensor 618 of the type described above relative to FIG. 5, i.e., including a pendulum 620 and corresponding switches 622a, 622b, though it is appreciated that other implementations of orbiting sensors may be equally employed. As shown, the switches 622a, 622b are in electrical communication with the processor 606, thereby providing signals to the processor 606 that facilitate detection of orbiting conditions.

As described above relative to FIG. 4, an electric actuator 408 is included in the hubodometer 600, in this implementation, in the form of an electrically operated generator/motor 630. In particular, the generator/motor 630 is provided by a combination of one or more electrical coils 634 and the one or more magnets 610. As known in the art, placing the coil(s) 634 in proximity to the moving magnetic field(s) 612 of the magnet(s) 610 allows electrical currents to be induced in the coil(s) 634, i.e., the coil(s) 634 and magnet(s) 610 operate as a generator. In turn, using known techniques, control circuitry 632 electrically connected to the coil(s) 634 operates to rectify, filter, condition, etc. such induced currents that are then used to charge a battery 636. The charge thus stored in the battery 636 may be used to power the various electrically powered devices of the pendulous assembly 604.

As those skilled in the art will further appreciate, any device capable of operating as a generator can also be operated as a direct current (DC) motor, and vice versa. For example, a brushed DC motor can be used, by externally driving the rotor thereof, to generate a DC voltage, whereas a brushless DC motor can be used, again by externally driving the rotor thereof, to generate an alternating current (AC) voltage. Thus, with respect to the implementation illustrated in FIG. 6, the combination of the coil(s) 634 and magnet(s) 610 can also be used, if power from the battery 636 is used to energize the coil(s) 634 rather than received currents from the coil(s) 634, to effectuate a form of a brushless DC motor. That is, by appropriately timing energization (and polarity) of the coil(s) 634 relative to the rotating magnet(s) 610, a "motor" force may be applied to pendulous assembly 604 to control, or more specifically, counteract, forces causing an orbiting condition of the pendulous assembly 604.

FIG. 7 illustrates a hubodometer 700 in which like numbered components relative to FIG. 6 are configured and operate in essentially the same manner as described above. FIG. 7 differs from FIG. 6, in that FIG. 7 illustrates a scheme in which a generator/motor 730 is mechanically coupled to the housing 602. In particular, the housing 602 includes a ring gear 736 mounted on an interior surface of the housing 602. In turn, the generator/motor 730 is operatively coupled to, preferably fixedly mounted on, the pendulous assembly 604 and may comprise, for example, a suitable DC motor that may be used for both the generation of power (through external driving of the rotor) or conventional motor operation. In this case, the generator/motor 730 may comprise a suitable mechanical coupling 734 such as a pinion gear configured to enmesh with corresponding teeth of the ring gear 736.

Configured in this manner, when no orbiting condition has been detected, the generator/motor 730 can be controlled by the control circuitry 732 (suitably configured according to known techniques) to select generator operation of the generator/motor 730 such that rotation of the housing 602 and ring gear 736 causes rotation of the pinion gear 734, thereby driving the rotor of the generator/motor 730 to generate power for recharging the battery 636. On the other hand, when an orbiting condition is detected, the processor 606 may operate the control circuitry to place the generator/motor 730 in motor operation such that power supplied by the battery 636 to the motor 730 causes a countervailing force to be applied to the pendulous assembly 604, thereby countering the detected orbiting condition.

Figure 8:
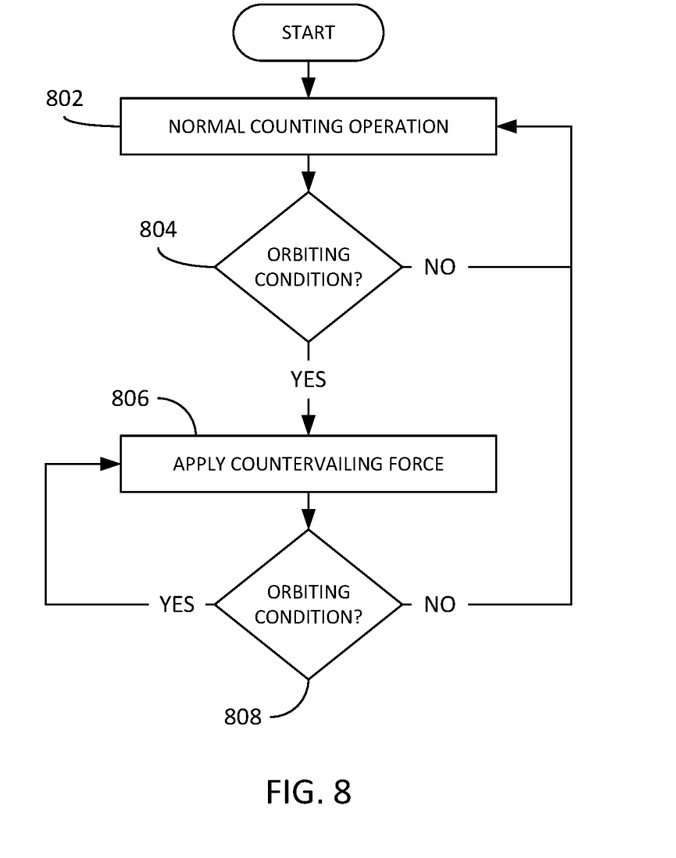
FIG. 8 is a flow chart illustrating processing in accordance with the instant disclosure.

Referring now to FIG. 8, processing in accordance with the instant disclosure is further described. For example, the processing illustrated in FIG. 8 may be implemented as stored instructions executed by a processor as described, for example, relative to FIGS. 4, 6 and 7.

Thus, beginning at block 802, normal counting operation by the hubodometer is performed. In this state, no orbiting condition has been detected. Processing continues at block 804 where it is determined whether an orbiting condition has been detected using, for example, the above-described techniques. If no orbiting condition is detected at block 804, processing once again continues at block 802.

The processing of blocks 802 and 804 is continuously performed until such time that the query of block 804 is answered in the affirmative, i.e., an orbiting condition has been detected. In this case, processing continues at block 806 where a countervailing force (i.e., a force in a direction opposite the orbiting direction) is applied to the pendulous assembly. The magnitude and duration of the countervailing force will be necessarily dependent upon the degree of orbiting indicated by the orbiting condition. For example, where the orbiting condition is a precursor to full rotation orbiting (e.g., sufficiently large oscillations), then the countervailing force may be made to be comparatively low magnitude and/or short in duration such that the orbiting condition is canceled before it has a chance to develop into full rotation orbiting. On the other hand, if the orbiting condition is full rotation orbiting, then the countervailing force may be made to be comparatively high in magnitude and/or long in duration so as to fully cancel out the orbiting of the pendulous assembly.

Regardless, once the countervailing force has been applied, processing may continue at block 808 where it is once again determined if an orbiting condition is still detected. If not, i.e., the orbiting condition has been canceled, then processing once again resumes at block 802 with normal counting operation. Otherwise, a continuous loop between steps 806 and 808 is established where the countervailing force is applied until such time that the orbiting condition has been canceled. In this case, it may be desirable to keep track of the number of times that the orbiting condition continues to be detected at block 808 such that each successive iteration of block 806 is performed with a countervailing force of greater magnitude and/or longer duration in order to ensure cancelation of the orbiting.

While the various embodiments in accordance with the instant disclosure have been described in conjunction with specific implementations thereof, it is evident that many alternatives, modifications and variations will be apparent to those skilled in the art. For example, while techniques for detecting an orbiting condition have been described separately, it may be desired to combine such techniques in order to ensure more robust detection, i.e., to eliminate false positive detections. Accordingly, the preferred embodiments of the invention as set forth herein are intended to be illustrative only and not limiting so long as the variations thereof come within the scope of the appended claims and their equivalents.

What is claimed is:

1. A method of operating a hubodometer having a housing that rotates relative to a pendulous assembly, the method comprising:
    detecting, by at least one orbiting sensor operatively connected to the pendulous assembly, an orbiting condition of the pendulous assembly, the orbiting condition being at least partly defined by an orbiting direction; and
    responsive to detecting the orbiting condition, applying, by an electric actuator operatively connected to the pendulous assembly, a countervailing force to the pendulous assembly in a direction opposite the orbiting direction.

2. The method of claim 1, wherein the at least one orbiting sensor operates to determine an angle of the pendulous assembly relative to a gravitational normal direction, and wherein detecting the orbiting condition further comprises detecting that the angle of the pendulous assembly exceeds an angular threshold.

3. The method of claim 2, wherein the at least one orbiting sensor comprises a pendulum and at least one switch positioned according to the angular threshold, wherein detecting that the angle of the pendulous assembly exceeds the angular threshold further comprises sensing actuation of the at least one switch by the pendulum.

4. The method of claim 1, wherein the at least one orbiting sensor comprises at least one accelerometer, and wherein detecting the orbiting condition further comprises determining that an output value of the accelerometer exceeds an acceleration threshold.

5. The method of claim 1, wherein the electric actuator is a generator-motor component operatively connected to the pendulous assembly and magnetically coupled to the housing, and wherein applying the countervailing force further comprises generating a magnetic field by the generator-motor component, which magnetic field induces the countervailing force relative to at least one magnet attached to the housing.

6. The method of claim 1, wherein the electric actuator is a generator-motor component operatively connected to the pendulous assembly and mechanically coupled to the housing, and wherein applying the countervailing force further comprises reversing operation of the generator-motor component.

7. A hubodometer having a housing that rotates relative to a pendulous assembly, and further comprising:
  at least one orbiting sensor operatively connected to the pendulous assembly and configured to detect an orbiting condition of the pendulous assembly, the orbiting condition being at least partly defined by an orbiting direction; and
  an electric actuator operatively connected to the pendulous assembly and configured, responsive to the detection of the orbiting condition, to apply a countervailing force to the pendulous assembly in a direction opposite the orbiting direction.

8. The hubodometer of claim 7, wherein the at least one orbiting sensor is configured to determine an angle of the pendulous assembly relative to a gravitational normal direction and operative to detect the orbiting condition when the angle of the pendulous assembly exceeds an angular threshold.

9. The hubodometer of claim 8, wherein the at least one orbiting sensor comprises a pendulum and at least one switch positioned according to the angular threshold and operative to detect that the angle of the pendulous assembly exceeds the angular threshold by sensing actuation of the at least one switch by the pendulum.

10. The hubodometer of claim 7, wherein the at least one orbiting sensor comprises at least one accelerometer operative to detect the orbiting condition when an output value of the accelerometer exceeds an acceleration threshold.

11. The hubodometer of claim 7, wherein the electric actuator is a generator-motor component operatively connected to the pendulous assembly and magnetically coupled to the housing and operative to generate a magnetic field that induces the countervailing force relative to at least one magnet attached to the housing.

12. The hubodometer of claim 7, wherein the electric actuator is a generator-motor component operatively connected to the pendulous assembly and mechanically coupled to the housing, and operative to reverse operation of the generator-motor component to induce the countervailing force.

* * * * *